US011412415B2

(12) United States Patent
Asawa et al.

(10) Patent No.: US 11,412,415 B2
(45) Date of Patent: Aug. 9, 2022

(54) SYSTEMS AND METHODS FOR ZERO-TOUCH INTERWORKING OF NETWORK ORCHESTRATION WITH DATA PLATFORM AND ANALYTICS IN VIRTUALIZED 5G DEPLOYMENT

(71) Applicant: DISH Wireless L.L.C., Englewood, CO (US)

(72) Inventors: Manjari Asawa, Cupertino, CA (US); Madhuri Muttreja, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/075,506

(22) Filed: Oct. 20, 2020

(65) Prior Publication Data
US 2022/0053375 A1    Feb. 17, 2022

Related U.S. Application Data

(60) Provisional application No. 63/065,431, filed on Aug. 13, 2020.

(51) Int. Cl.
*H04W 28/08*    (2009.01)
*H04W 28/20*    (2009.01)
(Continued)

(52) U.S. Cl.
CPC ....... *H04W 28/0958* (2020.05); *H04W 28/20* (2013.01); *H04W 48/10* (2013.01); *H04W 72/0453* (2013.01); *H04W 8/18* (2013.01)

(58) Field of Classification Search
CPC ..... H04W 48/16; H04W 48/14; H04W 28/02; H04W 28/0958; H04W 28/20; H04W 48/10
See application file for complete search history.

(56) References Cited

U.S. PATENT DOCUMENTS 10,708,368 B1   7/2020  Young et al.
11,071,055 B1*  7/2021  Wang ............... H04W 28/0268
(Continued)

FOREIGN PATENT DOCUMENTS

EP    3609161 A1    2/2020

OTHER PUBLICATIONS

International Search Report and Written Opinion for PCT/US2021/045394 dated Nov. 2, 2021, all pages.
(Continued)

*Primary Examiner* — Anez C Ebrahim
(74) *Attorney, Agent, or Firm* — Kilpatrick Townsend & Stockton LLP

(57) ABSTRACT

Systems, methods, and non-transitory, machine-readable media for zero-touch interworking of network control with data platform and analytics in virtualized deployment are disclosed. Responsive to a network service request for service location identifiers, data from data sources may be processed, and indicia of data characteristics may be analyzed to create or develop a data model. Configuration specifications may be created to instantiate a network slice and network services as a function of the data characteristics, conforming to quality of service parameters and service location identifiers. A log mapped to the request may be created and included in a template specifying a data observability framework and resources for the network slice and network services. The slice and services may be instantiated with the configuration specifications, with data services provided to user equipment of the external entity, and with the cellular network consequently providing data services to user equipment.

18 Claims, 4 Drawing Sheets

(51) Int. Cl.
    *H04W 48/10*     (2009.01)
    *H04W 72/04*     (2009.01)
    *H04W 8/18*     (2009.01)

(56) References Cited

U.S. PATENT DOCUMENTS

2019/0230003 A1*   7/2019   Gao ..................... H04L 41/069
2019/0394655 A1   12/2019   Rahman et al.
2020/0053834 A1    2/2020   Dahan et al.

OTHER PUBLICATIONS

Rodriguez et al., "Automating the deployment of 5G Network Slices using ONAP", 2019 10th International Conference on Networks of the Future (NOF), IEEE, Oct. 1, 2019, pp. 32-39, XP033728287, DOI: 10.1109/NOF47743.2019.9015043 [retrieved on Feb. 26, 2020] abstract paragraph [00I.]—paragraph [0VI.] figures 1-8.

* cited by examiner

SYSTEMS AND METHODS FOR ZERO-TOUCH INTERWORKING OF NETWORK ORCHESTRATION WITH DATA PLATFORM AND ANALYTICS IN VIRTUALIZED 5G DEPLOYMENT

CROSS-REFERENCE TO RELATED APPLICATION

The present application claims the benefit of and priority to U.S. Provisional Patent Application No. 63/065,431, filed Aug. 13, 2020, which is incorporated by reference herein in its entirety for all purposes.

TECHNICAL FIELD

This disclosure generally relates to wireless networks, and more particularly to systems and methods for zero-touch interworking of network orchestration with data platform and analytics in virtualized 5G deployment.

BACKGROUND

Mobile networks designs are inherently complex due to the need of providing innovative service that works seamlessly with mobility and roaming. While virtualization and cloud-native designs offer flexibility and potential cost savings, they increase the complexity of managing these networks tremendously.

Various standard bodies, notably 3GPP and ETSI have worked on defining network orchestration frameworks. ETSI had pioneered this work by creating a framework for the orchestration architecture and interfaces among various functional blocks. As per ETSI architecture, a network service (NS) is composed of VNFs (virtualized network functions) and PNFs (physical network functions) and/or other NS to support nested definitions. A network service descriptor (NSD) contains VNF (virtualized network function), PNF (physical network function), and NS descriptors. Over time, new network services may be developed and existing ones may be superseded.

Traditional network approaches work with fixed design of services with limitations on changes of designs. Further, traditional network approaches view each network component as a service and do not take into account the variation in service design and deployment of various levels of analytics during design times. This was not a concern as far since network analytics are often done post-deployment.

Thus, there is a need for systems and methods that address the foregoing problems. This and other needs are addressed by the present disclosure.

BRIEF SUMMARY

Certain embodiments disclosed in the present disclosure relates to wireless networks, and more particularly to systems and methods for zero-touch interworking of network orchestration with data platform and analytics in virtualized 5G deployment.

In one aspect, a method for zero-touch interworking of network control with data platform and analytics in virtualized deployment. The method may include one or a combination of the following. One or more network service requests may be received by a cellular network control system from an external entity distinct from an entity operating a cellular network and the cellular network control system. The one or more network service requests may indicate one or more service location identifiers requested by the external entity. Data from one or more data sources may be processed by the cellular network control system. At least some of the data may include indicia of data characteristics corresponding to one or more network functions, one or more network services, and/or one or more other data sources. The indicia of the data characteristics may be analyzed by the cellular network control system to create or develop a data model corresponding to the one or more network service requests. Configuration specifications may be created by the cellular network control system to instantiate a network slice and/or one or more network services corresponding to the network slice as a function of the data characteristics, the network slice and/or the one or more network services corresponding to the network slice conforming to one or more quality of service parameters and one or more service location identifiers. A log mapped to the one or more network service requests may be created by the cellular network control system and included in a template that specifies a data observability framework and resources for the network slice and/or the one or more network services corresponding to the network slice. Instantiation of the slice and/or the one or more services corresponding to the slice may be caused by the cellular network control system, in accordance with the configuration specifications with data services provided to user equipment of the external entity, with the cellular network consequently providing the data services to the user equipment of the external entity.

In another aspect, a cellular network control system is disclosed. The cellular network control system may include one or more communication interfaces configured to communicate with a plurality of cellular network components of a cellular network. The cellular network control system may include one or more processing devices communicatively coupled to the one or more communication interfaces. The cellular network control system may include memory communicatively coupled with and readable by the one or more processing devices and having stored therein processor-readable instructions which, when executed by the one or more processing devices, configure the cellular network control system to perform operations including one or a combination of the following. One or more network service requests may be received from an external entity distinct from an entity operating a cellular network and the cellular network control system. The one or more network service requests may indicate one or more service location identifiers requested by the external entity. Data from one or more data sources may be processed. At least some of the data may include indicia of data characteristics corresponding to one or more network functions, one or more network services, and/or one or more other data sources. The indicia of the data characteristics may be analyzed to create or develop a data model corresponding to the one or more network service requests. Configuration specifications may be created to instantiate a network slice and/or one or more network services corresponding to the network slice as a function of the data characteristics, the network slice and/or the one or more network services corresponding to the network slice conforming to one or more quality of service parameters and one or more service location identifiers. A log mapped to the one or more network service requests may be created and included in a template that specifies a data observability framework and resources for the network slice and/or the one or more network services corresponding to the network slice. Instantiation of the slice and/or the one or more services corresponding to the slice may be caused, in accordance with the configuration specifications with data services provided to user equipment of the external entity, with the cellular network consequently providing the data services to the user equipment of the external entity.

In yet another aspect, one or more machine-readable storage devices for storing machine-executable instructions are disclosed. The machine-executable instructions, when executed by one or more processing devices, cause the one or more processing devices to perform one or a combination of the following operations. One or more network service requests may be received from an external entity distinct from an entity operating a cellular network and the cellular network control system. The one or more network service requests may indicate one or more service location identifiers requested by the external entity. Data from one or more data sources may be processed. At least some of the data may include indicia of data characteristics corresponding to one or more network functions, one or more network services, and/or one or more other data sources. The indicia of the data characteristics may be analyzed to create or develop a data model corresponding to the one or more network service requests. Configuration specifications may be created to instantiate a network slice and/or one or more network services corresponding to the network slice as a function of the data characteristics, the network slice and/or the one or more network services corresponding to the network slice conforming to one or more quality of service parameters and one or more service location identifiers. A log mapped to the one or more network service requests may be created and included in a template that specifies a data observability framework and resources for the network slice and/or the one or more network services corresponding to the network slice. Instantiation of the slice and/or the one or more services corresponding to the slice may be caused, in accordance with the configuration specifications with data services provided to user equipment of the external entity, with the cellular network consequently providing the data services to the user equipment of the external entity.

In various embodiments, network data from a plurality of cellular network components of the cellular network may be collected over time. The plurality of cellular network components may include radio access network components and network data centers of the cellular network. The network data from the plurality of cellular network components may be analyzed to create or develop a cellular network model indicative of performance of discrete portions of the cellular network. In various embodiments, the network data and/or the cellular network model may be used to refine the data model. The data model may be used to create the configuration specifications.

In various embodiments, the one or more network service requests may correspond to a slice request and may indicate the one or more quality of service parameters. In various embodiments, the cellular network may be caused to provide the data services to the user equipment of the external entity in accordance with the one or more quality of service parameters and the one or more location identifiers. In various embodiments, at least some of the plurality of cellular network components may be configured to permit access to the cellular network by user equipment of the external entity in accordance with the configuration specifications.

In various embodiments, one or more data resources may be configured to facilitate the one or more services corresponding to the slice in accordance with the configuration specifications. In various embodiments, the indicia of data characteristics corresponding to the one or more network service requests from the external entity may be collected over time. In various embodiments, content may be transmitted to facilitate a user interface with a client device to allow for one or more selections corresponding to the slice request. A plurality of inputs received from the client device consequent to the one or more selections corresponding to the slice request may be processed, where the plurality of inputs indicate the one or more quality of service parameters and the one or more service location identifiers.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
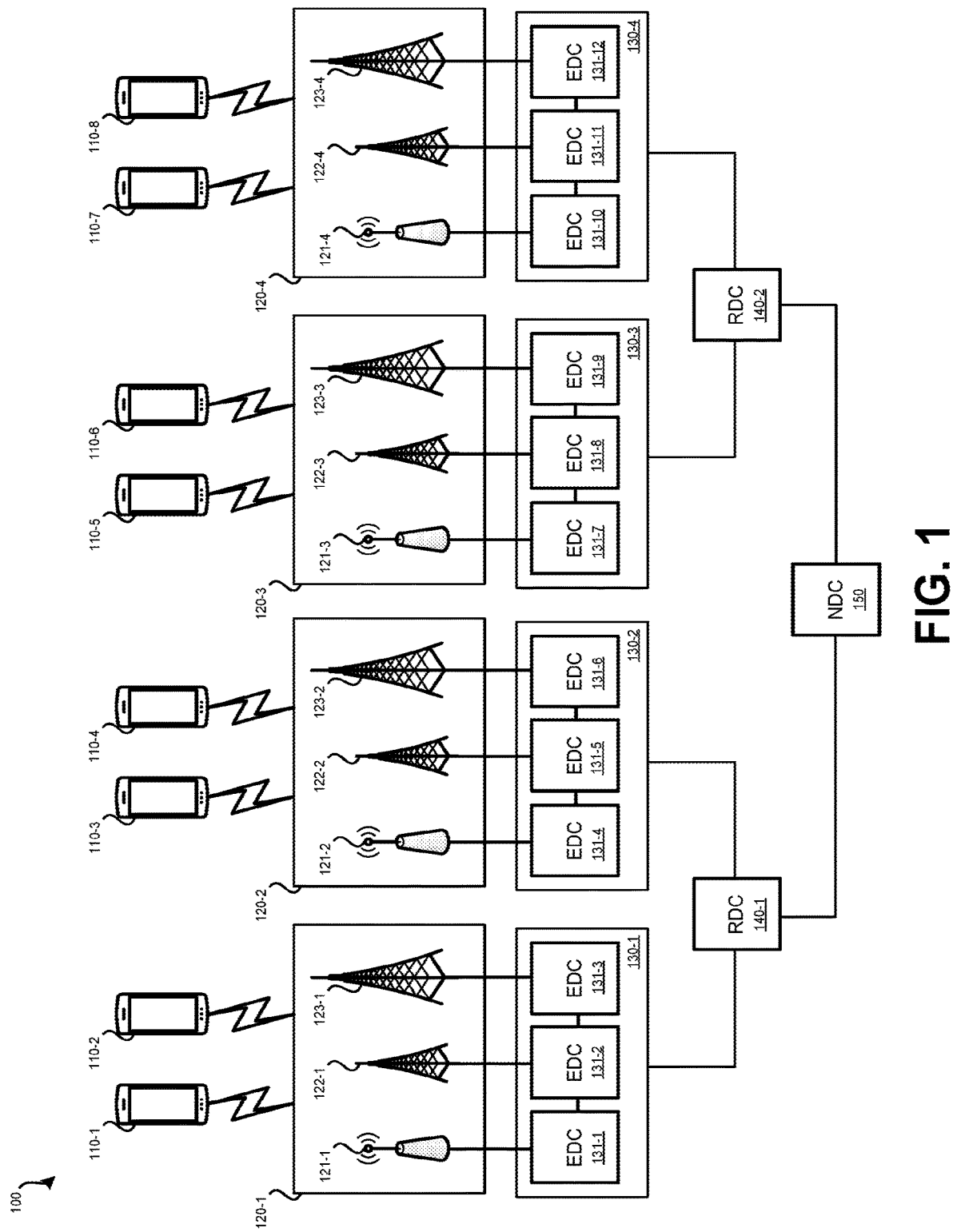
FIG. 1 illustrates an overall view of the system for network data and orchestration interworking, in accordance with disclosed embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Disclosed embodiments according to the present disclosure may solve the above-mentioned problems. Disclosed embodiments may provide for new services via dynamic orchestration. Via dynamic and data model adaptive orchestration, disclosed embodiments may provide for a fulfilment component of service management and may perform processes of automatically programming the network configuration and its behavior so that all required changes are coordinated across different hardware and software functions. With a well-designed service orchestration, embodiments may reduce the time taken to design new services and deploy configuration required for these designed services in real-time automatically.

Various embodiments may provide for systems and methods for zero-touch interworking of network orchestration with data platform and analytics in virtualized 5G deployment. With the increasing agility and complexity, network orchestration systems and methods according to the present disclosure may be flexible and responsive to changing requirements, such as high scalability, business agility, and security and operations automation. Disclosed embodiments may achieve this via an agile orchestration and automation mechanism that may instantiate new services and slices, configure CNFs (cloud-native network functions) for the best performance along with optimally place workloads dynamically. One key to achieve the above is an orchestration framework that treats data as a first class citizen and not as an afterthought. This means that the data may be part of service design, service instantiation, and service operations with dynamic check at each step.

The disclosed embodiments may facilitate a network orchestration framework that accounts for data as integral part of its working and operations dynamically. Disclosed embodiments may provide for systems and methods for seamlessly integrating network orchestration with data functions at each step, including onboarding, instantiating, operating and terminating the services along with the provision to deploy and reuse service specific data analytic functions, as well as managing their life cycles. Some embodiments may further utilize and leverage artificial intelligence and machine learning to provide various features of the zero-touch interworking of network orchestration with data platform and analytics in virtualized 5G deployment.

The proposed solution solves the issues identified above. It fills in the gap of agile and dynamic needs of data and analytics for the 5G network services and slices. The systems and methods introduce dynamic onboarding, instantiation and modifications of the data platform in a continuous and automated way with zero-touch. The systems and methods extend the network orchestrator, the slice designer and catalogue for dynamic data needs without breaking the overall orchestration framework and/or introducing unnecessary complexity but rather as an extended capability of the network orchestrator. The systems and methods also allow for dynamic configuration modification as needed.

The systems and methods may be extended to any data sources of the 5G Network that would like to use the data platform for its data and analytics needs, such as OSS (operations support system) and BSS (business support system). The data service and models may be made consumable via defining northbound APIs (application programming interfaces) from orchestration or data platform. Another benefit of such a solution is that it defines lifecycle of data in the context of lifecycle of a service/slice and supports a flexible and dynamic data consumption model for a client by making orchestration aware of changing requirements.

Various embodiments may include a dynamic system, a dynamic method, and/or one or more non-transitory, machine-readable media for zero-touch interworking of network orchestration with data platform and analytics in virtualized deployment, and that may perform one or a combination of: consuming the latest data from an internal or external repository system that includes data characteristics corresponding to the one or more network functions, services and other data sources that will be required to be included dynamically into the solution; onboarding using the cellular network model and the data model to create configuration specifications to instantiate a network slice and/or one or more network services corresponding to the network slice as a function of the data characteristics, the network slice and/or the one or more network services corresponding to the network slice conforming to one or more quality of service parameters and the one or more service location identifiers (the configuration generated in this step may become the requirements of the data platform to support the source as it gets instantiated); analyzing the indicia of the data characteristics to create or develop a data characteristics of the data solution developed in the catalogue corresponding to the one or more service and slice requests from the external entity; creating a catalogue for the given source request and making it part of the slice and service template for future creation of data observability framework and resources for the corresponding slices and services; receiving one or more requests corresponding to a slice request from an external entity distinct from an entity operating the cellular network and cellular network management system or from an internal entity, the one or more requests indicating one or more service location identifiers requested by the external or internal entity; creating using the cellular network model and the data model to create configuration specifications to instantiate a network slice and/or one or more network services corresponding to the network slice as a function of the data characteristics, the network slice and/or the one or more network services corresponding to the network slice conforming to one or more quality of service parameters and the one or more service location identifiers; instantiating the required resources of the slice and/or the one or more services corresponding to the slice in accordance with the configuration specifications with data services provided to the user equipment of the external entity, the cellular network consequently providing the data services to the user equipment of the external entity; collecting network data from a plurality of cellular network components of a cellular network over time, the plurality of cellular network components comprising radio access network components and network data centers of a cellular network; analyzing the network data from the plurality of cellular network components to create or develop a cellular network model indicative of performance of discrete portions of the cellular network; and using the input from these processed to further refine the data model for the service and slice creation and operation. All these capabilities may be enabled flexibly and dynamically with zero-touch using the proposed system and method described in the embodiments.

Various embodiments will now be discussed in greater detail with reference to the accompanying figures, beginning with FIG. 1.

FIG. 1 illustrates an embodiment of a hierarchical cellular network system 100 ("system 100"). A cellular network may include a radio access network (RAN) and a core cellular network. User equipment 110 may connect with the cellular network using various types of base stations or access points. User equipment may include: cellular phones; smart phones; video cameras; audio streaming devices; video streaming devices; modems; sensor devices; or any other form of wireless device that communicates with a cellular network. User equipment 110 may be in different geographical locations and may therefore use different components of the radio access network of the cellular network to communicate with the cellular network.

User equipment 110-1 and user equipment 110-2, based on where they are located, may communicate with some or all of radio access network components 120-1. Radio access network components 120-1 may include local access point 121-1, small base station 122-1, and large base station 123-1 (e.g., a gNodeB in a 5G New Radio (NR) cellular network). Local access point may provide coverage to a relatively small geographic area, such as within a house or building. Small base station 122-1 may provide cellular network access over an intermediate-sized geographical region and may have a capacity to handle fewer instances of user equipment than other base stations. For instance, small base station 122-1 may be installed in an urban environment to provide access within a neighborhood. Large base station 123-1 may provide cellular network coverage to a relatively large geographic area, such as along a highway or to cover a large neighborhood. Large base station 123-1 may have a capacity to handle a greater number of instances of user equipment than a small base station.

User equipment associated with particular clients may have reserved amounts of wireless bandwidth. Therefore, in particular cells of hierarchical cellular network system 100, even if there is not a high amount of wireless traffic between user equipment and base stations (and/or access points), wireless radio resources of the radio access network may be required to be reserved in order to fulfill previously-agreed to QoS metrics for particular clients.

Local access point 121-1, small base station 122-1, and large base station 123-1 may be part of a cellular network that operates according to one or more radio access technologies. For instance, the cellular network may be a 5G NR, 4G LTE, 3G, or GSM-based cellular network. Cellular networks may operate according to multiple radio access technologies. For instance, a cellular network may be a hybrid 4G and 5G network.

Each of local access point 121-1, small base station 122-1, and large base station 123-1 may communicate with an edge data center. In some embodiments, a dedicated edge data center may be used for each component or each type of component of the radio access network. For example, edge data center 131-3 may be dedicated to large base station 123-1. In other embodiments, edge data center 131-3 may serve multiple base stations in a geographic region. edge data center 131-2 may be dedicated to small base station 122-1 or may serve multiple base stations (e.g., only small base stations or a mix of different size base stations). Similarly, edge data center 131-1 may be dedicated to local access point 121-1 or a group of local access points.

Group of edge data centers 130-1 may serve as the interface of the cellular core network and may communicate with the components of the radio access network. Edge data centers 131-1, 131-2, and 131-3 may perform routing of data within the cellular core network. For example, data received by edge data center 131-2 intended for user equipment in communication with large base station 123-1 may be routed to edge data center 131-3 directly. However, not all edge data centers 131 communicate directly with each other. For instance, edge data center 131-4 may not communicate directly with edge data center 131-2. Therefore, if edge data center 131-2 is routing data to an user equipment in communication with edge data center 131-3, the data may need to be routed via another data center of the cellular core network, such as through regional data center 140-1. In this example, regional data center 140-1 serves as an intermediary node that routes data between edge data center 131-2 and edge data center 131-4.

Each regional data center, such as regional data center 140-1, may serve primarily to route data among different data centers. Regional data center 140-1 may be in communication with multiple edge data centers. If data is to be routed among edge data centers in direct communication with regional data center 140-1, components higher in the hierarchy of the cellular core network may not need to be involved in the routing of data. However, if data is being routed to an edge data center not in direct communication with regional data center 140-1, a component higher in the hierarchy of the cellular core network may need to be used to complete the routing.

National data center 150 may represent the highest level in the cellular network hierarchy of system 100. National data center 150 may communicate with all regional data centers 140 of the cellular core network. In turn, all of regional data centers 140 may be in communication with the edge data centers 131 of the cellular network. Such a hierarchy may allow for data anywhere within the cellular network to be routed to other devices. Edge data centers, regional data centers, and national data centers may collectively be referred to as nodes of the core cellular network.

As may be seen in FIG. 1, the configuration of radio access network components 120-1 and group of edge data centers 130-1 are replicated in other geographic regions: user equipment 110-3 and 110-4 communicate with radio access network components 120-2 (local access point 121-2, small base station 122-2, large base station 123-2), which communicate with group of edge data centers 130-2; user equipment 110-4 and 110-5 communicate with radio access network components 120-3 (local access point 121-3, small base station 122-3, large base station 123-3), which communicate with group of edge data centers 130-3; and user equipment 110-7 and 110-8 communicate with radio access network components 120-4 (local access point 121-4, small base station 122-4, large base station 123-4), which communicate with group of edge data centers 130-4. Group of edge data centers 130-2 (which includes edge data centers 131-4, 131-5, and 131-6) communicate with regional data center 140-1. Group of edge data centers 130-3 (which includes edge data centers 131-7, 131-8, and 131-9) and group of edge data centers 130-4 (which includes edge data centers 131-10, 131-11, and 131-12) communicate with regional data center 140-2. Regional data center 140-2 communicates with national data center 150.

In the example of system 100, only a small number of components are illustrated. For example, only user equipment 110-3 and user equipment 110-4 are shown as in communication with radio access network components 120-2. In reality, a much larger number of user equipment may use radio access network components 120-2 to communicate with the cellular network. Similarly, each group of radio access network components 120 may include many more local access points 121, small base stations 122, and/or large base stations 123. Fewer or greater numbers of edge data centers 131 may be present. There are fewer or greater numbers of levels within the hierarchy within the core cellular network. For example, in a cellular network if a greater number of edge data centers are present, one or more additional levels in the hierarchy below the national data center may be present.

Figure 2:
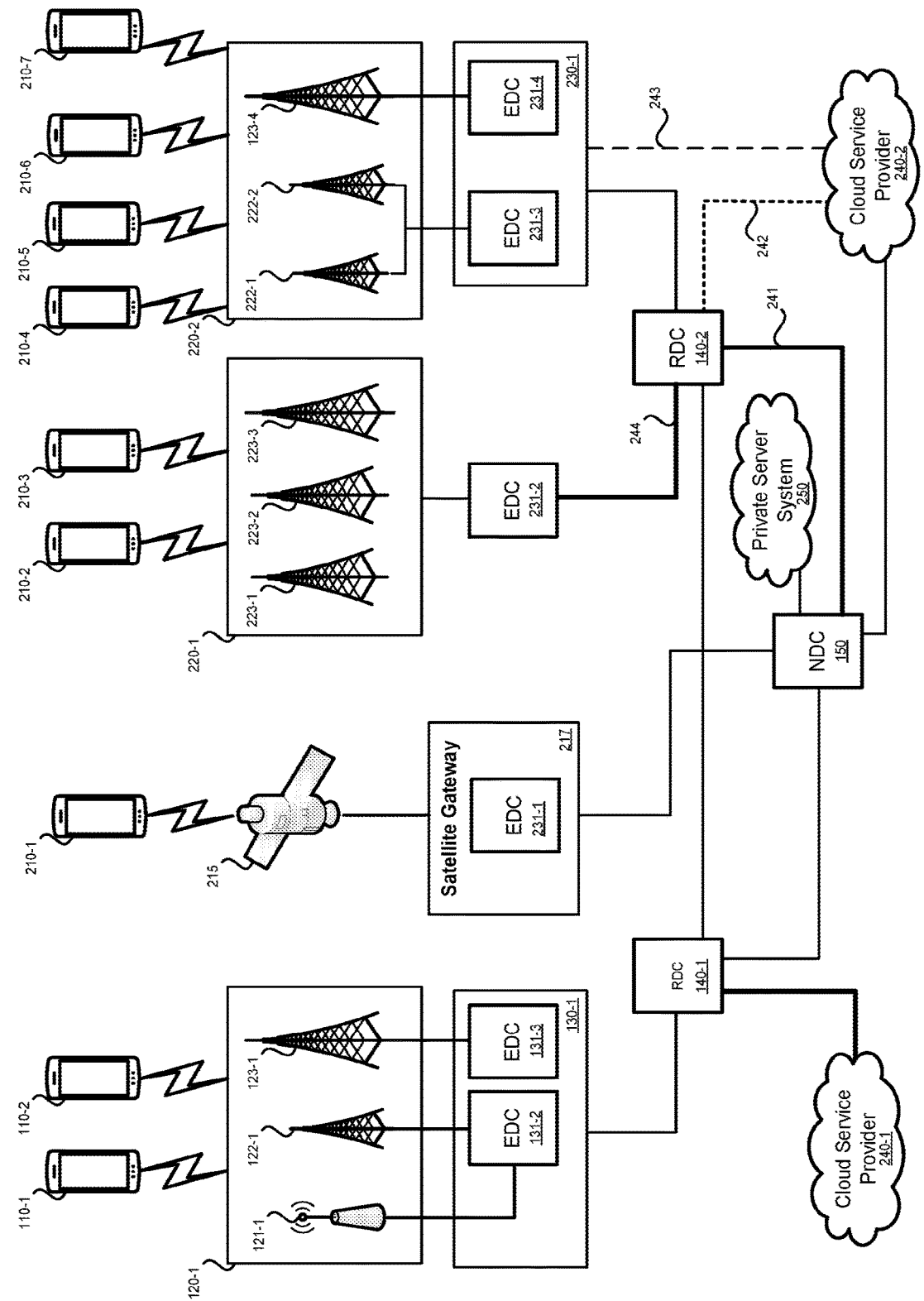
FIG. 2 illustrates depicts a simplified diagram of a distributed system accordance with disclosed embodiments of the present disclosure.

In system 100, the hierarchy is symmetrical in that each grouping of radio access network components 120 contains a local access point, small base station, and a large base station. Each of the radio access network components is in communication with an edge data center, and each group of edge data centers is in communication with a regional data center, which is in communication with a national data center. Such an arrangement is unlikely to be implemented in the real-world due to variances in the density of user equipment in a given area, variations in the amount of uplink and downlink traffic by user equipment in a given area, variations in geography, temporal usage trends, where user equipment tend to congregate, connections with cloud-service providers, and availability of bandwidth. FIG. 2 illustrates an embodiment of a more complex hierarchical cellular network more representative of a real-world cellular network hierarchy that may be present.

In system 200, variations in components within the cellular network may exist. User equipment 110-1 and user equipment 110-2 may communicate with radio access network components 120-1 as described in relation to system 100. However, in system 200, only two edge data centers may be present in group of edge data centers 130-1 and each edge data center of group of edge data centers 130-1 may not be able to communicate directly with each other. Each edge data center of group of edge data centers 130-1 may communicate with regional data center 140-1.

Various components, such as regional data center 140-1 and national data center 150, may communicate with cloud service providers 240. Cloud service providers may represent third-party service providers that provide storage and processing functionality that may be used by various entities. For instance, a client that may operate a variety of user equipment on system 200 may have storage and processing functions hosted by either cloud service provider 240-1 or cloud service provider 240-2. Additionally or alternatively, an entity may operate a private server system, such as private server system 250, that has storage and processing capabilities dedicated to the entity. cloud service providers 240 and private server system 250 may only have dedicated bandwidth with certain components of the cellular core network. For example, cloud service provider 240-1 has dedicated bandwidth with regional data center 140-1. Therefore, for example, if user equipment 210-6 requests data from cloud service provider 240-1, the request would possibly be routed through regional data center 140-2, national data center 150, and regional data center 140-1 or regional data center 140-2 and regional data center 140-1.

In system 200, not all wireless communication may be terrestrial. Rather, user equipment 210-1 may be a satellite modem or satellite phone that communicates via a low earth orbit (LEO), middle earth orbit (MEO), or geosynchronous earth orbit (GEO) satellite 215. Satellite 215 may relay communications between user equipment 210-1 and satellite gateway 217, which may include or be in communication with edge data center 231-1. As a possible deviation from the hierarchy of system 100, rather than edge data center 231-1 being in communication with an regional data center, edge data center 231-1 may communicate directly with national data center 150. Therefore, for example, if data is to be routed by user equipment 210-1 to user equipment 110-1, edge data center 231-1 may route the data through national data center 150 to regional data center 140-1 to edge data center 131-2.

In system 200, not every group of radio access network components includes the same equipment. For example, group of radio access network components 220-1 includes three large base stations 223-1, 223-2, and 223-3 which are all serviced by edge data center 231-1. In the example of FIG. 2, there is a high volume of user equipment (as represented by user equipment 210-4, user equipment 210-5, user equipment 210-6, and user equipment 210-7) communicating with group of radio access network components 220-2. radio access network components 220-2, which includes two small base stations 222-1 and 222-3 and a single large base station 123-4, are serviced by two edge data centers, 231-3, and 231-4 of group of edge data centers 230-1. Group of edge data centers 230-1 has dedicated bandwidth to communicate with cloud service provider 240-2. Therefore, it should be understood that the number and types of radio access network components that communicate with an edge data center may vary. Further, the components of the cellular core network that the edge data center communicates with may also vary.

The amount of bandwidth available between components of the cellular core network may be adjusted such that certain performance metrics may be realized. For example, user equipment 210-2 and 210-3 may require a certain minimum quality of service (QoS) metric (e.g., latency, jitter, packet loss, bandwidth, etc.) be met for communication with some remote system, such as private server system 250. In order to meet the QoS metric, additional dedicated bandwidth 244 may be established between edge data center 231-2 and regional data center 140-2 and dedicated bandwidth 241 may be established between regional data center 140-2 and national data center 150.

Dedicated bandwidth within the hierarchy of the cellular core network may be established between components to help realize particular QoS metrics. For instance, regional data center 140-1 and regional data center 140-2 may have direct dedicated bandwidth between them, such as to increase the bandwidth and decrease the latency for edge data center 231-1 and edge data center 231-3 to access cloud service provider 240-1.

System 200 may be able to accommodate smart routing, which may be used to compensate for unavailable connections. For instance, regional data center 140-2 may typically have dedicated bandwidth 242 to cloud service provider 240-2; however, dedicated bandwidth 242 may not be available due to a problem or maintenance being performed. Data that would be routed directly between regional data center 140-2 and cloud service provider 240-2 may instead be routed via national data center 150.

In system 200, the amount of bandwidth between radio access network components 120 and user equipment 110 may be assigned based on bandwidth QoS parameters of various clients. Therefore, in a given location, a particular client may have a reserved "slice" of the available radio resource blocks. When user equipment of the client are not using their reserved bandwidth, the bandwidth may be used to service user equipment of other clients. It also may be possible to overbook the bandwidth on the assumption that not all clients will request their maximum permitted amount of bandwidth at the same time. The amount of unreserved radio bandwidth at given locations may be factored into whether and under what conditions service will be provided to any new entities.

The number and arrangement of user equipment, base stations, edge data centers, regional data centers, national data center, cloud service providers, and private server systems of system 200 are merely examples. Further, the connections between such components are merely an example of how such a network may be arranged. A real-world cellular network deployed over a large geographical area would be significantly more complex and include a greater number of components.

Figure 3:
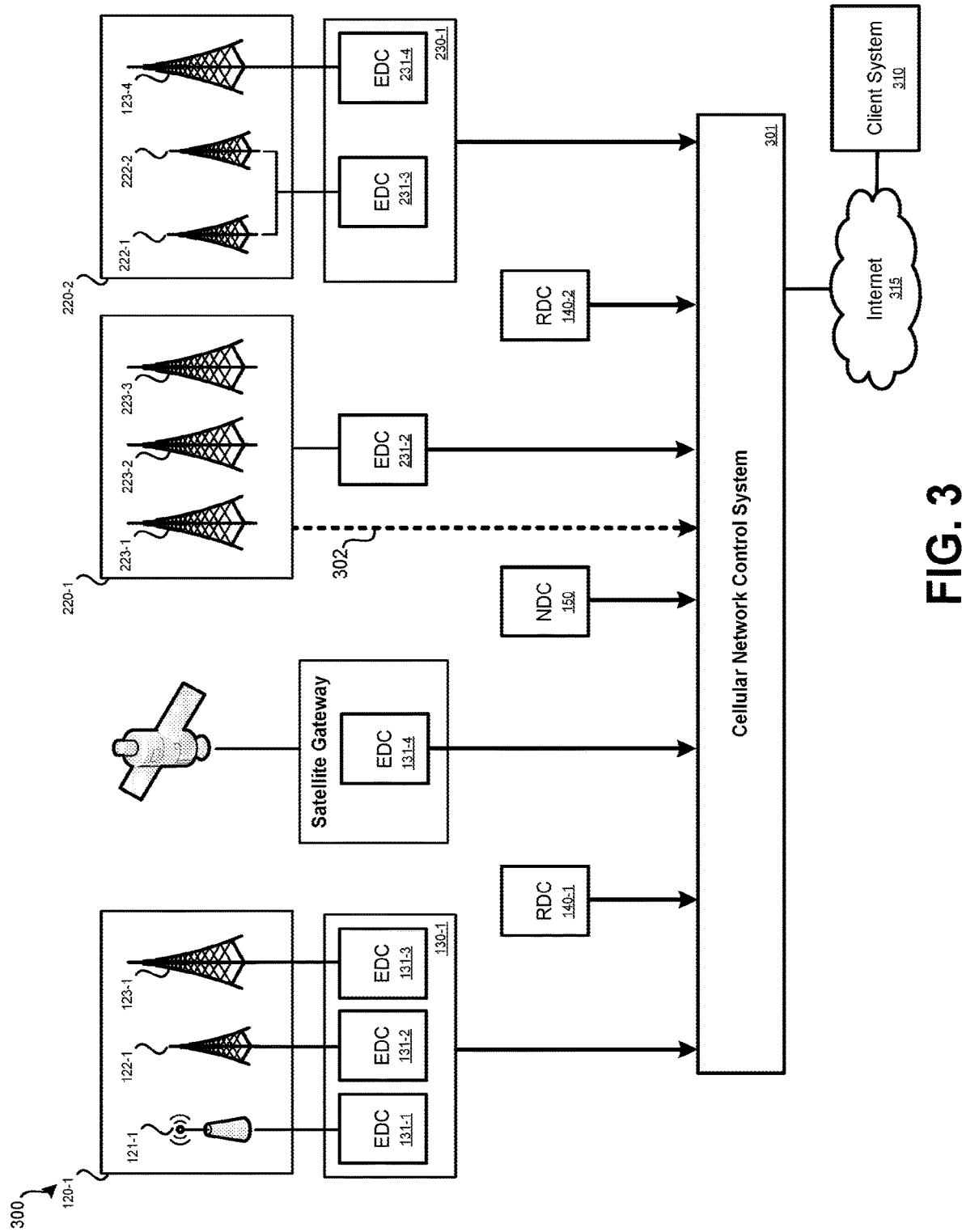
FIG. 3 illustrates simplified block diagram of one or more components of a system environment by which services provided by one or more components of a system may be offered as cloud services, in accordance with disclosed embodiments of the present disclosure.

FIG. 3 illustrates a cellular network control system 301 operating within a core network of a cellular network system 300, in accordance with certain embodiments of this disclosure. Cellular network system 300 may represent an embodiment of system 200 with the addition of cellular network control system 301. Cellular network control system 301 may be implemented using a server system that obtains performance data from the various components of the cellular core network.

Cellular network control system 301 may collect network data from a plurality of cellular network components of the cellular network over time, the plurality of cellular network components comprising radio access network components and network data centers of the cellular network. For example, cellular network control system 301 may request or may automatically receive status data (which may be timestamped) from all edge data centers, regional data centers, and an national data center of a cellular core network. If a greater number of tiers of components are present in a cellular network's core network, cellular network control system 301 receives status data from such components also. The status data received by cellular network control system 301 may include: number of user equipment being serviced; amount of bandwidth used; amount of bandwidth available; packet loss; latency; and jitter between components of the core network; and connections available in the core network. Cellular network control system 301 may receive performance data from edge data centers about radio access network components. For instance, cellular network control system 301, from an edge data center, may receive status data indicating: available radio resources, radio bandwidth, radio performance metrics and number of user equipment actively communicating with a base station or local AP.

Cellular network control system 301 may analyze the network data from the plurality of cellular network components to create or develop a cellular network model indicative of performance of discrete portions of the cellular network. Cellular network control system 301 may use the network data and/or the cellular network model to refine the data model it created or developed responsive to one or more client requests for services and/or network slices. The data model may be particularized to the particular client and requests, being a function of the data collected and analyzed, as further disclosed herein. Also as further disclosed herein, the cellular network control system 301 may use the data model to create the configuration specifications. For example, cellular network control system 301 may collect status data to create a model of the current end-to-end performance of the cellular core network and radio access network and the capabilities of the cellular core network and radio access network. The status data may be used to produce a usage model of the cellular network and adjust configuration over time. For instance, various portions of the cellular core network and radio access network may be highly utilized during certain times of the day or during certain events.

In some embodiments, each component of the cellular network periodically or occasionally sends status data to cellular network control system 301. In other embodiments, cellular network control system 301 transmits queries to each component of the cellular network and, in response, receives status data. In still other embodiments, a mix of queries and periodic or intermittent reporting is used. Additionally or alternatively, radio access network components 120 may transmit usage data to cellular network control system 301. Radio access network components 120 may transmit data indicative of radio resources being used and/or available between user equipment and the radio access network component transmitting the data. Therefore, for example, large base station 223-1 may transmit performance data indicative of the usage of radio resources to cellular network control system 301 as performance data 302. For example, such performance data could indicate a number or percentage of available resource blocks on the radio access network (a resource block being a defined timeslot on a subcarrier frequency during which a number of OFDM signals may be transmitted). Depending on the embodiment, radio access network components may relay such performance data to cellular network control system 301 via the cellular network system 300, such as via edge data center 231-2. In other embodiments, radio access network components, such as a gNodeB of large base station 223-1, may transmit performance data to cellular network control system 301 directly.

Various embodiments may provide network slices, network services, or both. The network services provided may include VNFs (virtualized network functions), PNFs (physical network functions), and/or other network services. The VNFs may include software-based functions that may be utilized in conjunction with one or more slices such as security functions, monitoring functions, and/or the like. The PNFs may include hardware components of the cellular network which cellular network control system 301 may configure to provide a network slice and/or other network services to a particular client.

Client system 310 may include one or more server systems that allow a client to send one or more requests to cellular network control system 301 via a network, such as the Internet 315. The one or more requests may correspond to a slice request. For example, the one or more requests may include a slice request, i.e., a request for one or more slices. Additionally, or alternatively, the one or more requests may include a service request, i.e., a request for one or more services. Further details regarding such requests and operations of cellular network control system 301 are disclosed further herein. It should be understood that many client systems may be in communication with cellular network control system 301 via Internet 315 and/or via other networks.

Figure 4:
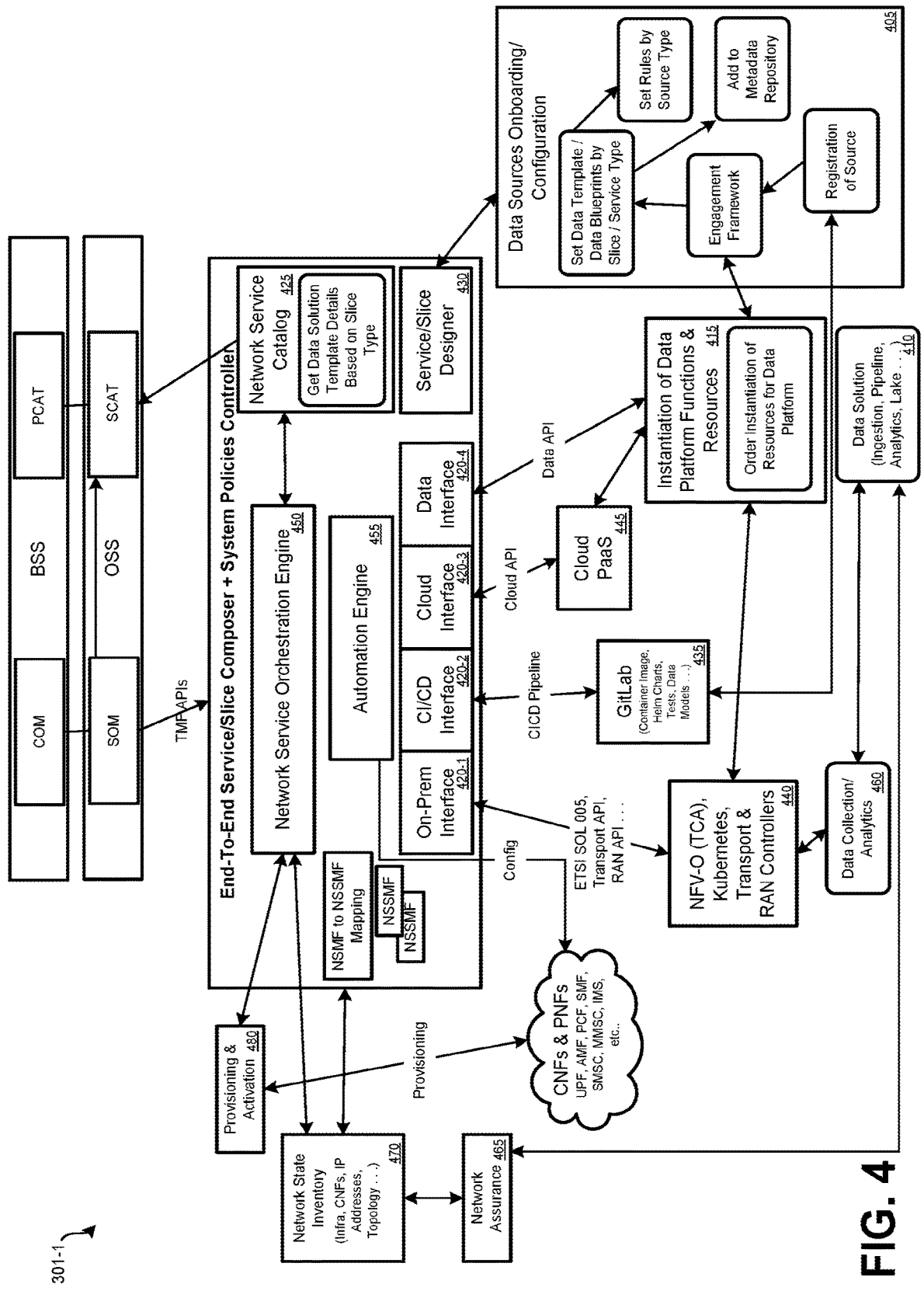
FIG. 4 illustrates an exemplary computer system, in accordance with disclosed embodiments of the present disclosure.

FIG. 4 illustrates the cellular network control system 301-1 for network data and orchestration interworking, in accordance with certain embodiments of this disclosure. Cellular network control system 301-1 be configured to perform methods for zero-touch interworking of network control with data platform and analytics in virtualized deployment. For brevity, cellular network control system 301-1 is depicted in a simplified and conceptual form, and may generally include more or fewer systems, devices, networks, and/or other components as desired.

In various embodiments, the number and types of features or elements incorporated within cellular network control system 301-1 may or may not be implementation-specific. Cellular network control system 301-1 may be implemented using one or more computer server systems such as those disclosed in the incorporated by reference provisional application. Cellular network control system 301-1 may include special-purpose processors that are specifically designed, and physically and electrically configured, to perform the functions/operations detailed herein. Cellular network control system 301-1 may include general-purpose processors may execute special-purpose software that is stored using one or more non-transitory processor-readable mediums. In various embodiments, cellular network control system 301-1 may have a distributed system and/or a system environment by which services may be offered as cloud services, with one or more servers, server components, cloud infrastructure systems, and/or data systems such as those disclosed in the incorporated by reference provisional application. As further disclosed therein, cellular network control system 301-1 may interface with various systems and devices, including one or more client computing devices.

Cellular network control system 301-1 may include a network service orchestration engine 450, a network service catalog 425, a service and slice designer 430, an automation engine 455, and an instantiation engine 415, among other components, configured to design and instantiate new network slices and network services, and configure cloud-native network functions (CNFs) as a function of the data characteristics of the client system operations anticipated to be used in conjunction with the network slices, network services, and/or CNFs. Such design and deployment may be performed in real time, automatically or responsive to client interface inputs. Further, such design and deployment may be adaptive to specific data needs of particular clients, slices, and/or services. Cellular network control system 301-1 may allow for each phase of onboarding, instantiating, operating, and terminating in the lifecycles of network slices, network services, and/or CNFs to be controlled as a function of the data characteristics. Further, cellular network control system 301-1 may allow for the reuse of service-specific data analytic functions. Cellular network control system 301-1 may utilize machine learning to detect and develop patterns of data needs as well as network performance characteristics in order to provide for adaptive design and deployment of services, slices, and CNFs as a function of cellular network models, each of which may be adapted and developed in real time as cellular network control system 301-1 continues to manage the cellular network and collect network data and client-specific data.

Cellular network control system 301-1 may include one or more interfaces 420, that may include an on-prem interface 420-1, a CI/CD interface 420-2, a cloud interface 420-3, a data interface 420-4, and/or the like. In various embodiments, the interfaces 420 may be separated or a combination of interfaces 420 may be integrated. Cellular network control system 301-1 may receive one or more source requests corresponding to a slice request and/or services from a client via one or more of the interfaces to the network service orchestration engine 450. Network service orchestration engine 450 translates the request into automation engine 455 workflow using the service and slice definition in catalogue 425 that is populated with data solution requirements. The template and workflow is used to define the workflow to applicable interfaces 420-1 to 420-4. For example, cellular network control system 301-1 may transmit content to facilitate a user interface with a client device to allow for one or more selections corresponding to the one or more slices and/or one or more specific services, one or a combination of which may be selected via selectable interface elements and submitted with one or more requests. In one aspect, a client may select a specific slice type. Operations support system may submit such one or more requests via the Internet or an IP interface. Cellular network control system 301-1 may process a plurality of inputs received from the operations support system consequent to the one or more selections corresponding to the slice request, where the plurality of inputs indicate the one or more parameters and one or more service location identifiers. However, in some embodiments, cellular network control system 301-1 may determine one or more of the parameters and service location identifiers automatically, without providing a client interface and receiving client inputs.

Further, some embodiments may define, as the service designer 430 is defining a slice, what the data requirements are to onboard the slice requirements as a function of the data requirements. Additionally, embodiments may also ensure that, when the slice is getting instantiated, the instantiation engine 415 may also instantiates resources needed for the anticipated data requirements and environment. In any case, embodiments may include a dynamic trigger for the provisioning 480 as a function of the data. As the network orchestrator 450 defines and configures the network resources, it also defines and configures the data resources for execution with the provisioning operations 480. As disclosed herein, the resources for the data system (which may correspond to a data hub architecture, a data lake, and/or the like) may be determined by the network orchestrator 450 when a dynamic slice or service is instantiated and/or needed.

With the data source onboarding and configuration operations 405, cellular network control system 301-1 may set and get the data platform needs for the one or more types of slices, services, and/or CNF corresponding to the one or more source requests. In some embodiments, as part of the artifacts that network function providers provide to CICD (continuous integration, continuous delivery/deployment) processes, data specifications may be provided in a specific format that captures details of the requirements from the data solution 410. The information may include details such as network source, data sources, type and purpose, data format, publishing model, suggested data retention policy, aggregation level, storage need, latency of data, metadata, contextual data, etc.

The data source onboarding and configuration operations 405 may include source registration. In some embodiments, the registration capability may consume the NF (network function) provider data and convert it into a format suitable for internal network consumption. The one or more source requests may include various parameters that specify requirements of the requested slice(s) and/or service(s). For example, the one or more requests may include one or more service location identifiers (and/or client, equipment, account, or address identifiers that the control system may map to one or more radio service locations). Service location identifiers may include any suitable indicator of location for the requested slice(s) and/or service(s) (e.g., an address, city, a zip code, etc.). Further, the one or more requests may indicate the one or more quality of service (QoS) parameters; number of user equipments; location of the user equipment; minimum bandwidth (per user equipment or total) required by location (to a particular server system);

maximum latency (per user equipment or average) by location (to a particular server system); days and times at which the QoS parameters of bandwidth, packet loss, latency, and jitter must be met; date and/or time at which the service is to go into effect (or a date/time range when the service is to be in effect). The network slice and/or the one or more network services provided by cellular network control system 301-1 may correspond to the network slice conforming to the one or more parameters and the one or more service location identifiers. For example, a slice request may have certain requirements corresponding to specify parameters such as high-speed, low latency, a downtown location in particular city. As a further example, added on to a particular slice may be network services such as security services, monitoring, and the like.

Cellular network control system 301-1 may process data from one or more data sources, at least some of the data including indicia of data characteristics corresponding to one or more network functions, one or more network services, and/or one or more other data sources. Data sources may provide specifications on the data and its metadata. The data sources may provide such specifications in any suitable form (e.g., JSON, XML, and/or the like), and may contain Helm charts. In some embodiments, a data source may correspond to one or more client devices and/or one or more client systems. In various embodiments, the data may be actively gathered and/or pulled from one or more data sources, for example, by accessing a repository and/or by "crawling" various repositories. Additionally or alternatively, cellular network control system 301-1 may wait for updates from one or a combination of the one or more data sources. The data pulled and/or pushed from the one or more data sources may be transformed, and the transformed data and/or other data generated based thereon may be used by the cellular network control system 301-1 for the various features disclosed herein, which are functions of the data.

Cellular network control system 301-1 may analyze the data for of data characteristics to create or develop a data model corresponding to the one or more requests. Cellular network control system 301-1 may determine anticipated kinds of data to be generated, anticipated data collection requirements, anticipated data consumption requirements, anticipated data storage requirements, anticipated data transfer requirements, anticipated data calculation requirements, and/or the like data characteristics for one or more particular slices, services, and/or CNFs for a particular client.

In some embodiments, such data may be gathered into or received with an extended package as part of the onboarding phase.

Cellular network control system 301-1 may create configuration specifications to instantiate a network slice and/or one or more network services corresponding to the network slice as a function of the data characteristics, the network slice and/or the one or more network services corresponding to the network slice conforming to the specified parameters (e.g., conforming to one or more QoS parameters, one or more service location identifiers, and/or the like). For example, cellular network control system 301-1 may use such data and/or data characteristics to define the requirements of the source to store the data in the data platform. Cellular network control system 301-1 may create and/or populate a source onboarding template. The information could be stored in a repository 435, such as Harbor, Gitlab for each service type, slice type, CNF, and/or the like. The details may include configuration, performance target, QoS constraints, metadata of the performance parameters, and/or the like. For example, data may be collected, processed, and mapped to fields of the source onboarding template, then transformed to formatted values for populating of the fields, which may include one or combination of the following.

1. Source Profile
 1.1. Source Name
 1.2. Operation
 1.3. Operation Account
 1.4. Contact
2. Operational Metadata
 2.1. Context of the source data
 2.2. Domains of the source data
 2.3. Data Structure
 2.4. Data Class
3. Ingest
 3.1. Volume
 3.2. Speed
 3.3. Schedule
 3.4. Data Format
4. Capabilities required within the Data Platform (based on the Service Order)
5. Consumption/Destination of the data ingested
6. Intent of the data to define/pick the pipeline requirement)
 6.1. Data Classification Routing Logic
 6.2. Operational Rules
 6.3. Filters
 6.4. Downstream usage instructions/rules
7. Data Ops (performance and QoS requirements)
 7.1. KPIs and metrics
 7.2. Threshold actions
 7.3. SLAs expected
 7.4. Load and Traffic characteristics
8. Default Settings
 8.1. Encryption
 8.2. Data in Transit
 8.3. Data At Rest
 8.4. Archival/LCM/Retention needs
 8.5. HA/DR/Backup
 8.6. Quality Requirements Cellular network control system 301-1 may store the template and process it with a rules engine. For the data platform, the template may serves as source data that may be used by data platform and the network service orchestration engine 450. The template may specify details for the downstream pipeline blueprint and may specify one or more targeted states of the ingested data and forwarding data needs. The template may specify information to facilitate definition of the needed storage, compute resources and/or management and operation needs of the data platform to support the slice/service types data. Thus, configurations details required for the data solution 410 to support the one or more requests may now be defined. A data onboarding API (source-template) may place the template content into the components of the data platform which contains a metadata management engine, which may include or otherwise correspond to a rules engine. The data platform may derive data processing rules from the details in the onboarding information. Additional details that are required to orchestrate the solution for dynamic needs are and derived based on AI/ML (artificial intelligence/machine learning). These may include rules and policies, resources, and capabilities. In some embodiments, cellular network control system 301-1 may create a digital log/catalog (network service catalog 425) mapped to the one or more types of requests. In some embodiments, cellular network control system 301-1 may include the digital catalog 425 in the template that specifies a data observability framework and resources for the network slice and/or the one or more network services corresponding to the network slice. In some embodiments, the map of the data platform capabilities and its physical configuration may be stored in its data platform catalog. This may include a capability list (from the onboarding template and additional as per the required hardware and/or software resources to support the capabilities.

In some embodiments, based at least in part on the network policies and ingested data model, a data engagement framework may be created for the network function to define data platform needs for the service or slice type. It may include additional parameters specific to the service/slice type. The engagement framework may be the contract that is between the source that is requesting to use the data platform and the data platform itself to what it will deliver. The contract may include the capability list derived from the onboarding template and additional supporting requirements.

As part of the onboarding operations 405, the data platform orchestrator 450 may receive the template via the data onboarding API. A configuration may be generated to become the requirements of the data platform to support the source as it gets instantiated. The data platform blueprint image for the given source request may be generated and passed to the network orchestrator service catalogue 425 data interface 420-4. The engagement framework and the data template may be used to define a data blueprint that may be used to fill in data specific requirements for a slice/service during their design time in the orchestration. Relevant information may be set in the rules engine and metadata repository so that they are available for the entire network for data and analytics capabilities. This may be extended to enable slicing and dicing data in any form. The data platform image/blueprint for the request may specify rules, policies, and metadata about the data solution 410, such as:
1. NW Source Identification
1.1. Source Id
1.2. Source Context (where data is expected to come from)
2. Environment
2.1. Location Context
3. Infrastructure
3.1. Compute
3.2. Storage
3.3. Memory
4. Data Platform Capabilities List
4.1. Monitoring
4.2. Logging
4.3. Etc.
5. Data Stores
5.1. Folder
5.2. Data Bases
5.3. Object Store
5.4. Cache As part of the network service orchestration engine's operations post onboarding into the data platform, the data blueprint for the slices/services/functions may be sent to the slice/service designer 430 that will use it during the slice and service design as appropriate. For example, a data catalog API (for the data platform blueprint) may place this template content into the network orchestrator's catalog 425. The blueprint may be in any suitable form (e.g., a JSON file). The network orchestrator's designer 430 may use the data blueprint and append additional details that correlate it to the environment that the network resources are required for the one or more slices, services, and/or CNFs. This may be to ensure that the capabilities required from the data and analytics requirements are created alongside the network service. The service and slice designer 430 may generate a file, such as YAML, associated with the slice/service requirement and may store the file in the network service catalog 425. In some embodiments, the file may be stored in the network service catalog 425 for future use to serve requests from the service order manager. When a request comes to the orchestrator for a slice or a service, as part of instantiation of the service/slice, the data function may be called via a data interface adapter to instantiate the capabilities in the data platform relevant to that service/slice as specified in the network service catalog 425.

For current or future requests, instantiation in the data platform may be triggered by the network service orchestration engine 450. As part of the slice/service/function instantiation in the 5G network, the data interface of the automation engine 455 may extract the associated file from the network service catalog 425 and may invoked the instantiation of the resources for the data platform. A data instantiate API may invokes a data platform instantiation engine 415 with the associated file.

Instantiation of the resources for the data platform may be ordered and may be based at least in part on the following. The instantiation capability may include data and analytics objects with the details related to the data function and may specify the storage and compute resources that have been allocated for the specific slice or service type. In some embodiments, the instantiate capability may review the template and confirm against the engagement framework. For example, the data platform instantiation engine 415 may validate the input based on the initial definition stored in the metadata and rules engine. Any additional operational metadata or process rules may be added to the metadata and the rules engine. As this is accepted, an order may be issued to the resource controllers 440 (if the service/slice design specifies use of cloud resources) to start creating required resources per the template specifications, and the instructions to Kubernetes, radio access network controller, and/or transport controller 440, and/or cloud interface 420-3 to pull the relevant computational functions images.

A CICD pipeline may be triggered that uses the file communicated via the API. The data platform instantiation engine 415 may instantiate compute, storage, and memory in the environment using associated host and port details, K8 clusters, nodes, and/or the like. The Kubernetes, radio access network controller, and/or transport controller 440, and/or cloud PaaS 445 may create required compute, network and storage resources and may initiate specified data collection and analytics functions. The data platform instantiation engine 415 may instantiate functional capability modules and associated code using as Jenkins pulls in code from the Github repository 435. The instantiation of the resources may then be ready to start the ingest of data for the slice/service/function that requested storing data in the data platform. The data may be then passed onto the data platform for further analytics as specified by the data platform.

Accordingly, cellular network control system 301-1 may cause instantiation of the slice and/or the one or more services corresponding to the slice in accordance with the configuration specifications with data services provided to user equipment of the client so that the cellular network consequently provides the data services to the user equipment of the client. Cellular network control system 301-1 may cause the cellular network to provide the data services to the user equipment of the external entity in accordance with the one or more parameters (e.g., QoS parameters) and the one or more location identifiers. Accordingly, cellular network control system 301-1 may configure at least some of the plurality of cellular network components to permit access to the cellular network by user equipment of an external entity (e.g., client) in accordance with the configuration specifications. Further, cellular network control system 301-1 may configure one or more data resources to facilitate the one or more services corresponding to the slice in accordance with the configuration specifications.

Thus, disclosed embodiments may provide for one or more of the steps of the above being a function of the particular data requirements and environments. Disclosed embodiments may provide for additional functions to a suite of network functions provided with instantiation of new services and/or slices, which, consequent to set up and confirmation with the system, involve large amounts of data that may be intelligently handled when a network is getting set up. Nnetwork functions need to be executed when a network is getting set up. Additional functions may include functions supporting client-specific data/policy management. Disclosed embodiments may activate slices, services, and/or CNFs at the right time with the right information.

Further, as disclosed herein, cellular network control system 301-1 may self-adjust automatically and dynamically based at least in part on ongoing data collection and data analytics 460, network assurance 465, and updated network state inventory 470. In some embodiments, such ongoing monitoring and collection may be performed based at least in part on SNMP, Prometheus, and/or the like. Thus, while cellular network control system 301-1 may instantiate particular slices, services, and/or CNFs according to initial configurations, cellular network control system 301-1 may continue to detect network changes and/or client data use changes. When such changes are detected, cellular network control system 301-1 may adapt the above disclosed operations as a function of such changes and re-instantiate or otherwise modify the initial instantiations. This may include, for example, changing resources, reconfiguring the network components, and/or changing the analyses performed as part of the services and/or CNFs (e.g., downgrading data collection from every 15 minutes to every 30 minutes in view of increasing bandwidth limitations, and adjusting resources accordingly).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method for zero-touch interworking of network control with data platform and analytics in virtualized deployment, the method comprising:
   collecting, by a cellular network control system, network data from a plurality of cellular network components of a cellular network over time, the plurality of cellular network components comprising radio access network components and network data centers of the cellular network;
   analyzing, by the cellular network control system, the network data from the plurality of cellular network components to create or develop a cellular network model indicative of performance of discrete portions of the cellular network;

receiving, by the cellular network control system, one or more network service requests from an external entity distinct from an entity operating the cellular network and the cellular network control system, the one or more network service requests indicating one or more service location identifiers requested by the external entity;

processing, by the cellular network control system, data from one or more data sources, at least some of the data comprising indicia of data characteristics corresponding to one or more network functions, one or more network services, and/or one or more other data sources;

analyzing, by the cellular network control system, the indicia of the data characteristics to create or develop a data model corresponding to the one or more network service requests;

creating, by the cellular network control system, configuration specifications to instantiate a network slice and/or one or more network services corresponding to the network slice as a function of the data characteristics, the network slice and/or the one or more network services corresponding to the network slice conforming to one or more quality of service parameters and the one or more service location identifiers;

creating, by the cellular network control system, a log mapped to the one or more network service requests and included in a template that specifies a data observability framework and resources for the network slice and/or the one or more network services corresponding to the network slice; and causing, by the cellular network control system, instantiation of the network slice and/or the one or more network services corresponding to the network slice in accordance with the configuration specifications with data services provided to user equipment of the external entity, the cellular network consequently providing the data services to the user equipment of the external entity.

2. The method for zero-touch interworking of network control with data platform and analytics in virtualized deployment as recited in claim 1, the method further comprising:
using the network data and/or the cellular network model to refine the data model;
where the data model is used to create the configuration specifications.

3. The method for zero-touch interworking of network control with data platform and analytics in virtualized deployment as recited in claim 1, where the one or more network service requests correspond to a slice request and indicate the one or more quality of service parameters.

4. The method for zero-touch interworking of network control with data platform and analytics in virtualized deployment as recited in claim 1, the method further comprising:
causing, by the cellular network control system, the cellular network to provide the data services to the user equipment of the external entity in accordance with the one or more quality of service parameters and the one or more service location identifiers.

5. The method for zero-touch interworking of network control with data platform and analytics in virtualized deployment as recited in claim 1, the method further comprising:
configuring, by the cellular network control system, at least some of the plurality of cellular network components to permit access to the cellular network by user equipment of the external entity in accordance with the configuration specifications.

6. The method for zero-touch interworking of network control with data platform and analytics in virtualized deployment as recited in claim 1, the method further comprising:
configuring, by the cellular network control system, one or more data resources to facilitate the one or more network services corresponding to the network slice in accordance with the configuration specifications.

7. The method for zero-touch interworking of network control with data platform and analytics in virtualized deployment as recited in claim 1, the method further comprising:
collecting, by the cellular network control system, the indicia of data characteristics corresponding to the one or more network service requests from the external entity over time.

8. The method for zero-touch interworking of network control with data platform and analytics in virtualized deployment as recited in claim 1, the method further comprising:
transmitting, by the cellular network control system, content to facilitate a user interface with a client device to allow for one or more selections corresponding to a slice request;
processing, by the cellular network control system, a plurality of inputs received from the client device or a remote entity consequent to the one or more selections corresponding to the slice request, where the plurality of inputs indicate the one or more quality of service parameters and the one or more service location identifiers.

9. A cellular network control system comprising:
one or more communication interfaces configured to communicate with a plurality of cellular network components of a cellular network;
one or more processing devices communicatively coupled to the one or more communication interfaces; and
memory communicatively coupled with and readable by the one or more processing devices and having stored therein processor-readable instructions which, when executed by the one or more processing devices, configure the cellular network control system to perform operations comprising:
collecting network data from a plurality of cellular network components of a cellular network over time, the plurality of cellular network components comprising radio access network components and network data centers of the cellular network;
analyzing the network data from the plurality of cellular network components to create or develop a cellular network model indicative of performance of discrete portions of the cellular network;
receiving one or more network service requests an external entity distinct from an entity operating the cellular network and the cellular network control system, the one or more network service requests indicating one or more service location identifiers requested by the external entity;

processing data from one or more data sources, at least some of the data comprising indicia of data characteristics corresponding to one or more network functions, one or more network services, and/or one or more other data sources;

analyzing the indicia of the data characteristics to create or develop a data model corresponding to the one or more network service requests;

creating configuration specifications to instantiate a network slice and/or one or more network services corresponding to the network slice as a function of the data characteristics, the network slice and/or the one or more network services corresponding to the network slice conforming to one or more quality of service parameters and the one or more service location identifiers;

creating a log mapped to the one or more network service requests and included in a template that specifies a data observability framework and resources for the network slice and/or the one or more network services corresponding to the network slice; and causing instantiation of the network slice and/or the one or more network services corresponding to the network slice in accordance with the configuration specifications with data services provided to user equipment of the external entity, the cellular network consequently providing the data services to the user equipment of the external entity.

10. The cellular network control system as recited in claim 9, the operations further comprising:
using the network data and/or the cellular network model to refine the data model;
where the data model is used to create the configuration specifications.

11. The cellular network control system as recited in claim 9, where one or more network service requests correspond to a slice request and the one or more network service requests indicate the one or more quality of service parameters.

12. The cellular network control system as recited in claim 9, the operations further comprising:
causing the cellular network to provide the data services to the user equipment of the external entity in accordance with the one or more quality of service parameters and the one or more service location identifiers.

13. The cellular network control system as recited in claim 9, the operations further comprising:
configuring at least some of the plurality of cellular network components to permit access to the cellular network by user equipment of the external entity in accordance with the configuration specifications.

14. The cellular network control system as recited in claim 9, the operations further comprising:
configuring one or more data resources to facilitate the one or more network services corresponding to the network slice in accordance with the configuration specifications.

15. The cellular network control system as recited in claim 9, the operations further comprising:
collecting the indicia of data characteristics corresponding to the one or more network service requests from the external entity over time.

16. The cellular network control system as recited in claim 9, the operations further comprising:
transmitting content to facilitate a user interface with a client device to allow for one or more selections corresponding to a slice request; and
processing a plurality of inputs received from the client device consequent to the one or more selections corresponding to the slice request, where the plurality of inputs indicate the one or more quality of service parameters and the one or more service location identifiers.

17. One or more non-transitory, machine-readable media having machine-readable instructions thereon which, when executed by one or more processing devices, cause the one or more processing devices to perform operations comprising:
collecting network data from a plurality of cellular network components of a cellular network over time, the plurality of cellular network components comprising radio access network components and network data centers of the cellular network;
analyzing the network data from the plurality of cellular network components to create or develop a cellular network model indicative of performance of discrete portions of the cellular network;
receiving one or more network service requests from an external entity distinct from an entity operating the cellular network and a cellular network control system, the one or more network service requests indicating one or more service location identifiers requested by the external entity;
processing data from one or more data sources, at least some of the data comprising indicia of data characteristics corresponding to one or more network functions, one or more network services, and/or one or more other data sources;
analyzing the indicia of the data characteristics to create or develop a data model corresponding to the one or more network service requests;
creating configuration specifications to instantiate a network slice and/or one or more network services corresponding to the network slice as a function of the data characteristics, the network slice and/or the one or more network services corresponding to the network slice conforming to one or more quality of service parameters and the one or more service location identifiers;
creating a log mapped to the one or more network service requests and included in a template that specifies a data observability framework and resources for the network slice and/or the one or more network services corresponding to the network slice; and
causing instantiation of the network slice and/or the one or more network services corresponding to the network slice in accordance with the configuration specifications with data services provided to user equipment of the external entity, the cellular network consequently providing the data services to the user equipment of the external entity.

18. The one or more non-transitory, machine-readable media as recited in claim 17, where the one or more network service requests correspond to a slice request and indicate the one or more quality of service parameters.

* * * * *